United States Patent
Segawa et al.

(10) Patent No.: US 6,942,597 B2
(45) Date of Patent: Sep. 13, 2005

(54) LOCKUP CONTROL OR TORQUE CONVERTER

(75) Inventors: Satoshi Segawa, Atsugi (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 10/756,501

(22) Filed: Jan. 14, 2004

(65) Prior Publication Data

US 2004/0162184 A1 Aug. 19, 2004

(30) Foreign Application Priority Data

Feb. 13, 2003 (JP) ........................................ 2003-035176

(51) Int. Cl.[7] ............................ F16H 61/58; B60K 41/02
(52) U.S. Cl. ............................... 477/62; 477/61; 477/64; 477/169; 477/181
(58) Field of Search .............................. 477/62, 61, 64, 477/70, 168–169, 174–175, 181

(56) References Cited

U.S. PATENT DOCUMENTS

| 6,066,072 A | | 5/2000 | Adachi |
| 6,086,513 A | * | 7/2000 | Tominaga .................... 477/169 |
| 6,820,597 B1 | * | 11/2004 | Cullen et al. ................ 123/520 |

* cited by examiner

Primary Examiner—Tisha Lewis
(74) Attorney, Agent, or Firm—Foely & Lardner LLP

(57) ABSTRACT

An engaging force of a pump impeller (1a) connected to an engine (21) and a turbine runner (1b) connected to an automatic transmission (23) is controlled by a controller (5). The controller (5) determines a target relative rotation speed of the pump impeller (1a) and the turbine runner (1b), and performs feedback control of the engaging force such that the difference between the target relative rotation speed and the real relative rotation speed is decreased. The controller (5) also performs feedforward control of the engaging force in a increasing direction. When the engine (21) is in a predetermined engine-stall prevention condition, the controller (5) prohibits the feedforward control so as to prevent an interference between feedback control and feedforward control.

10 Claims, 13 Drawing Sheets

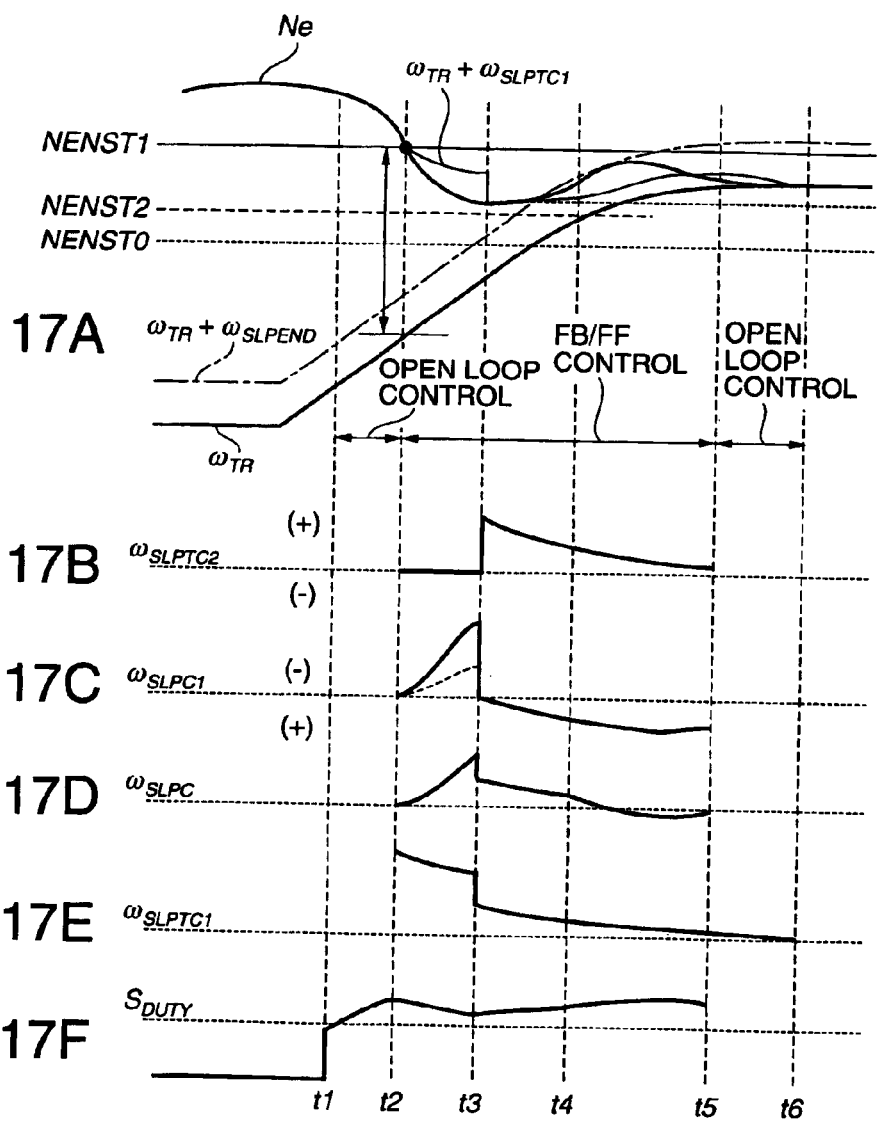

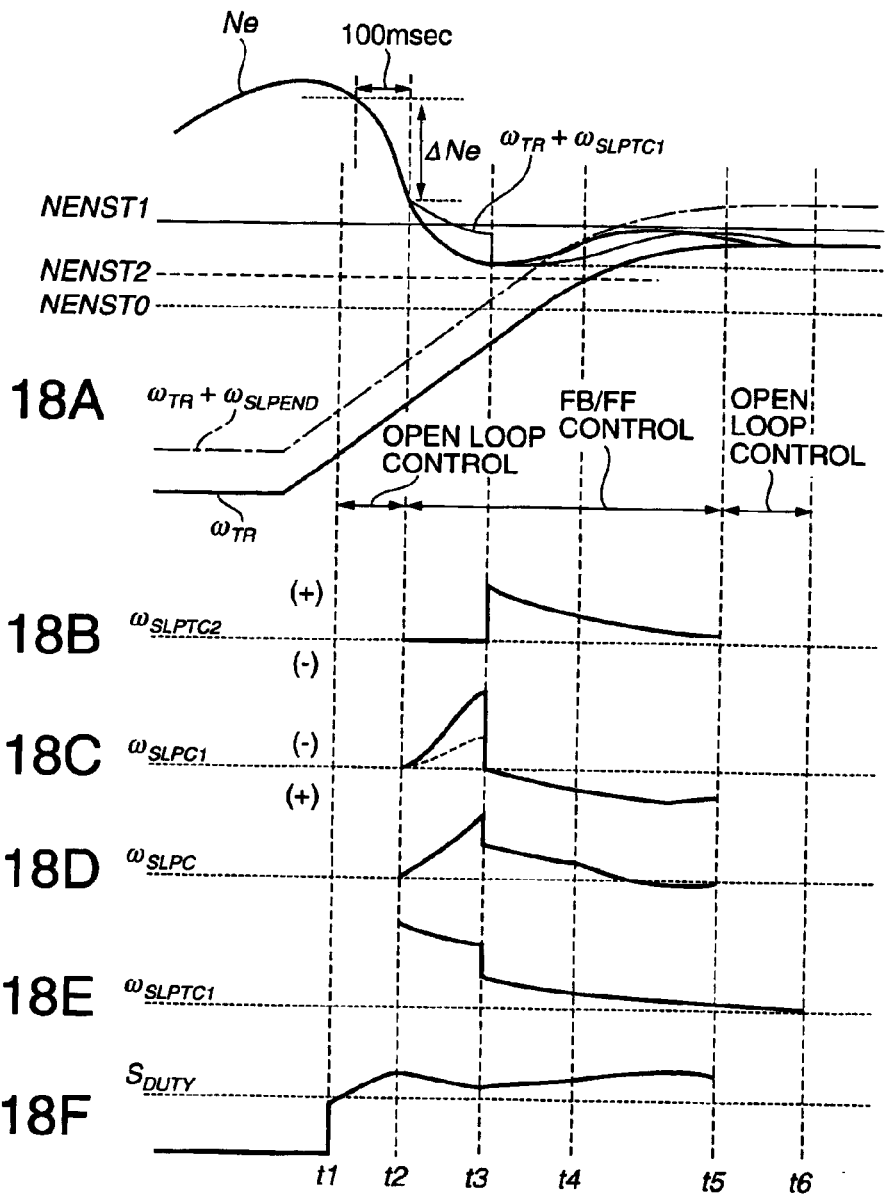

LOCKUP CONTROL OR TORQUE CONVERTER

FIELD OF THE INVENTION

This invention relates to control of an engaging force of a lockup clutch associated with a torque converter for a vehicle.

BACKGROUND OF THE INVENTION

U.S. Pat. No. 6,066,072 discloses lockup control of a lockup clutch associated with a torque converter for a vehicle. The torque converter connects an engine and an automatic transmission of the vehicle and comprises a pump impeller connected to the engine and a turbine runner connected to the transmission. An output torque of the engine is transmitted to the transmission via a fluid between the pump impeller and the turbine runner. The lockup clutch engages the pump impeller with the turbine runner such that the torque is transmitted directly.

The ratio of a torque transmitted via fluid and a torque transmitted via the lockup clutch depends on an engaging force applied to engage the lockup clutch. When the engaging force is the minimum, the entire torque is transmitted via fluid, and when the engaging force is the maximum, the entire torque is transmitted via the lockup clutch.

According to the prior art, when the lockup clutch is engaged after the vehicle starts, the engaging force is first controlled by an open loop control. As the engaging force increases, a relative rotation speed of the pump impeller and turbine runner of the torque converter decreases.

According to the prior art, when the relative rotation speed decreases to a predetermined relative rotation speed, control of the engaging force is changed over from the open loop control to a feedback/feedforward control.

The feedback/feedforward control of the engaging force is constituted by a feedback control and a feedforward control. In the feedback/feedforward control, a target relative rotation speed is determined according to engine running conditions. The feedback control of the engaging force is performed so as to decrease a difference between the target relative rotation speed and the real relative rotation speed. The feedforward control of the engaging force is performed in combination with the feedback control so as to increase the engaging force to a feedforward control value determined according to the target relative rotation speed. The feedforward control is implemented to enhance a control response of the engaging force.

SUMMARY OF THE INVENTION

In the course of the above engaging force control, the engine rotation speed may falls sharply due to an external disturbance or a deviation of the real engaging force from an engaging force command output to an actuator that regulates the engaging force of the lockup clutch.

In order to prevent the engine from stalling, it is necessary to precisely control the engaging force of the lockup clutch. However, when the engaging force is controlled by feedforward/feedback control as performed by the prior art control, there is a possibility that the feedback control tends to reduce the engaging force while the feedforward control still tends to increase the engaging force. As a result, the engaging force does not change promptly, and the engine rotation speed may fall further.

When the engine rotation speed finally falls to a predetermined engine-stall critical speed, the lockup clutch is forcibly disengaged to prevent the engine from stalling.

According to the prior art control, therefore, the engine rotation speed may largely fluctuate during the engagement of the lockup clutch, and a sudden release of the lockup clutch may occur.

It is therefore an object of this invention to suppress the fluctuation of the engine rotation speed during the engagement of the lockup clutch and to realize a smooth engagement of the lockup clutch.

In order to achieve the above object, this invention provides a lockup control device for a lockup clutch of a torque converter for a vehicle. The torque converter comprises a pump impeller connected to an engine and a turbine runner connected to an automatic transmission, and transmits a torque between the pump impeller and the turbine runner via a fluid and the lockup clutch according to an engaging force of the lockup clutch. The lockup control device comprises a mechanism which regulates the engaging force, a sensor which detects a rotation speed of the pump impeller, a sensor which detects a rotation speed of the turbine runner, a sensor which detects a running condition of the engine, and a programmable controller. The rotation speed of the pump impeller is equal to an engine rotation speed. The controller is programmed to calculate a real relative rotation speed of the pump impeller and the turbine runner from the rotation speed of the pump impeller and the rotation speed of the turbine runner, determine a target relative rotation speed based on the running condition of the engine, perform a feedback control of the mechanism based on a difference between the target relative rotation speed and the real relative rotation speed to cause the difference to decrease, perform a feedforward control of the mechanism in an increasing direction of the engaging force based on a predetermined feedforward control value, in combination with the feedback control, determine from the engine rotation speed whether or not the engine is in a predetermined engine-stall prevention condition, and prohibit the feedforward control from being performed when the engine is in the predetermined engine-stall prevention condition.

This invention also provides a lockup control method of the lockup clutch. The method comprises determining a rotation speed of the pump impeller that is equal to an engine rotation speed, determining a rotation speed of the turbine runner, determining a running condition of the engine, calculating a real relative rotation speed of the pump impeller and the turbine runner from the rotation speed of the pump impeller and the rotation speed of the turbine runner, determining a target relative rotation speed based on the running condition of the engine, performing a feedback control of the engaging force regulating mechanism based on a difference between the target relative rotation speed and the real relative rotation speed to cause the difference to decrease, performing a feedforward control of the engaging force regulating mechanism in combination with the feedback control, in an increasing direction of the engaging force based on a predetermined feedforward control value, determining from the engine rotation speed whether or not the engine is in a predetermined engine-stall prevention condition, and prohibiting the feedforward control from being performed when the engine is in the predetermined engine-stall prevention condition.

The details as well as other features and advantages of this invention are set forth in the remainder of the specification and are shown in the accompanying drawings.

BRIEF DESCRIPTION OF THE DRAWINGS

FIGS. 17A–17F are timing charts describing results of lockup control by the controller.

FIGS. 18A–18F are timing charts describing another results of lockup control by the controller.

DESCRIPTION OF THE PREFERRED EMBODIMENTS

Figure 1:
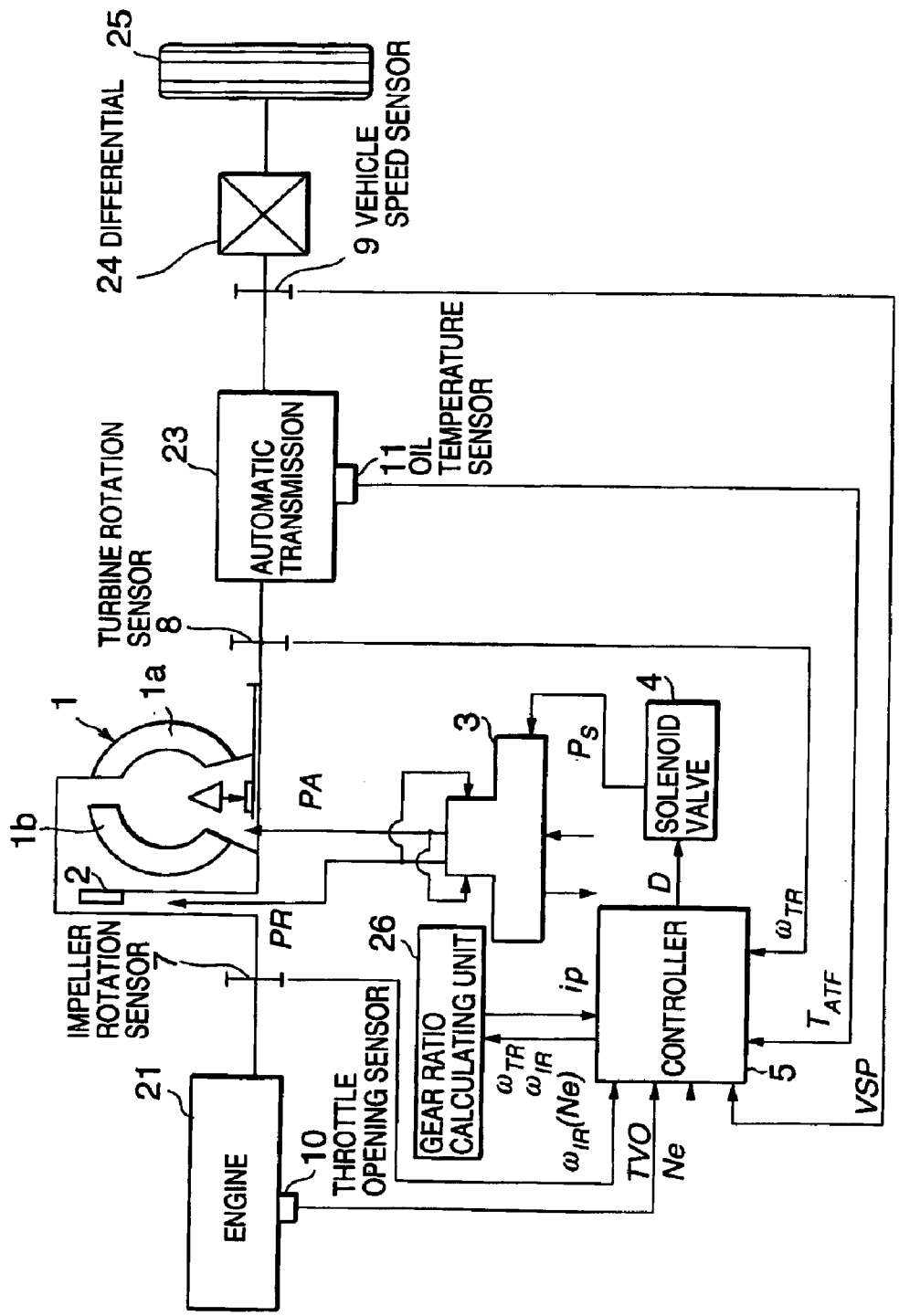
FIG. 1 is a schematic diagram of a power train of a vehicle provided with a lockup clutch according to this invention.

Referring to FIG. 1 of the drawings, a multi-cylinder engine 21 for a vehicle is connected to an automatic transmission 23 via a torque converter 1, and an output torque of the automatic transmission 23 is transmitted to a driving wheel 25 via a differential 24. The automatic transmission 23 is constituted by a continuously variable transmission.

The torque converter 1 is provided with a pump impeller 1a driven by the engine 21, a turbine runner 1b joined to the input shaft of the automatic transmission 23, and a lockup clutch 2 which directly connects the pump impeller 1a and turbine runner 1b.

The engaging force of the lockup clutch 2 is determined by a differential pressure (PA−PR) between an application pressure PA and a release pressure PR.

When the application pressure PA is lower than the release pressure PR, the lockup clutch 2 will be in an unlocked state, and the pump impeller 1a and turbine runner 1b will rotate according to the torque transmission function of the fluid interposed therebetween.

When the application pressure PA is higher than the release pressure PR, the lockup clutch 2 is engaged by an engaging force depending on the differential pressure (PA−PR).

When the differential pressure (PA−PR) is small, the pump impeller 1a and turbine runner 1b transmit a torque according to the differential pressure (PA−PR) while performing relative rotation.

When the differential pressure (PA−PR) becomes larger than a preset value, the pump impeller 1a and turbine runner 1b will be in a direct connection state without relative rotation, i.e., a lockup state.

In the state which does not result in a lockup where relative rotation is possible, the torque converter 1 delivers torque by two pathways, i.e., torque transmitted by the fluid, and by mechanical transmission by the lockup clutch 2. The engine output torque is equal to the total torque.

Therefore, if the fluid transmission torque is subtracted from the engine output torque, the torque transmitted via the lockup clutch 2 can be calculated. The transmission torque of the lockup clutch 2 is hereinafter expressed as the torque capacity of the lockup clutch 2.

The torque capacity of the lockup clutch 2 is controlled by a control device comprising a slip control valve 3, a solenoid valve 4, a controller 5 and a gear ratio calculation unit 26.

Figure 2:
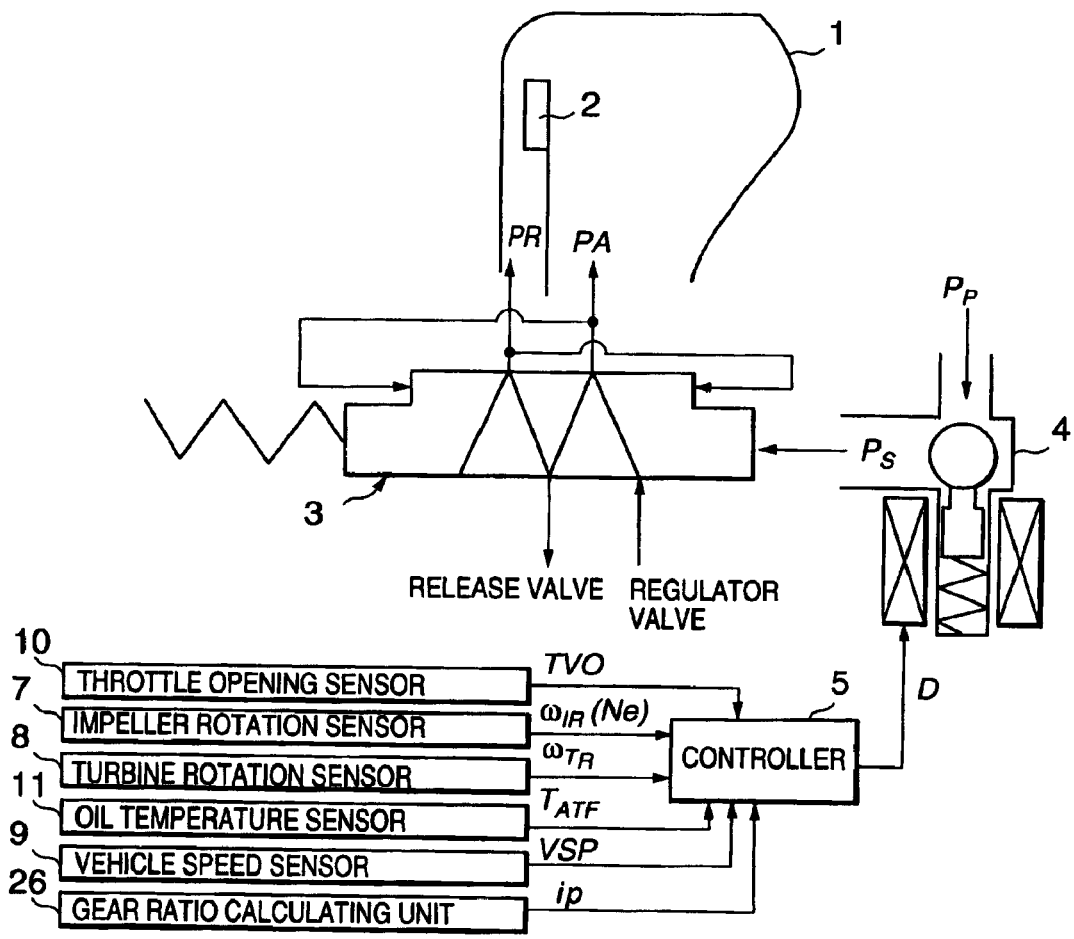
FIG. 2 is a schematic diagram of a lockup control device according to this invention.

Referring to FIG. 2, the control valve 3 supplies the application pressure PA and release pressure PR to the lockup clutch 2 according to a signal pressure Ps input from the solenoid valve 4. The control valve 3 makes the pressure difference between the application pressure PA and release pressure PR, i.e., the engaging pressure of the lockup clutch 2, vary according to the signal pressure Ps.

The solenoid valve 4 adjusts the pump pressure Pp supplied from the oil pressure source to the signal pressure Ps using a solenoid which responds to a duty signal D. The duty signal D is outputted from the controller 5.

The controller 5 comprises a microcomputer provided with a central processing unit (CPU), read-only memory (ROM), random access memory (RAM) and input/output interface (I/O interface). The controller may also comprise plural microcomputers.

The controller 5 controls the differential pressure (PA−PR) applied to the lockup clutch 2 according to whether the running state of the vehicle corresponds to a converter region, a slip region or a lockup region. In the first half of the slip region, open loop control of the differential pressure (PA−PR) is performed, and in the second half of the slip region, feedback/feedforward control of the differential pressure (PA−PR) is performed. The controller 5 controls the differential pressure (PA−PR) by the output of the duty signal D to the solenoid valve 4.

To generate the duty signal D, signals are input to the controller 5 from a throttle opening sensor 10 which detects a throttle opening TVO of the engine 21, an impeller rotation sensor 7 which detects a rotation speed $\omega_{IR}$ of the pump impeller 1a, a turbine rotation sensor 8 which detects a rotation speed $\omega_{TR}$ of the turbine runner 1b, an oil temperature sensor 11 which detects an oil temperature $T_{ATF}$ of the automatic transmission 23, a vehicle speed sensor 9 which detects a vehicle speed VSP, and a signal which shows a calculation result from a gear ratio calculation unit 26, respectively. Since the pump impeller 1a is directly connected to the engine 21, the rotation speed $\omega_{IR}$ of the pump impeller 1a is also used as a rotation speed Ne of the engine 21.

The gear ratio calculation unit 26 calculates a real gear ratio ip of the automatic transmission 23 from the rotation speed $\omega_{TR}$ of the turbine runner 1b and the vehicle speed VSP, and inputs it to the controller 5. The gear ratio calculation unit 26 comprises the same microcomputer as that of controller 5. The controller 5 and the gear ratio calculation unit 26 may also comprise the same microcomputer.

Figure 3:
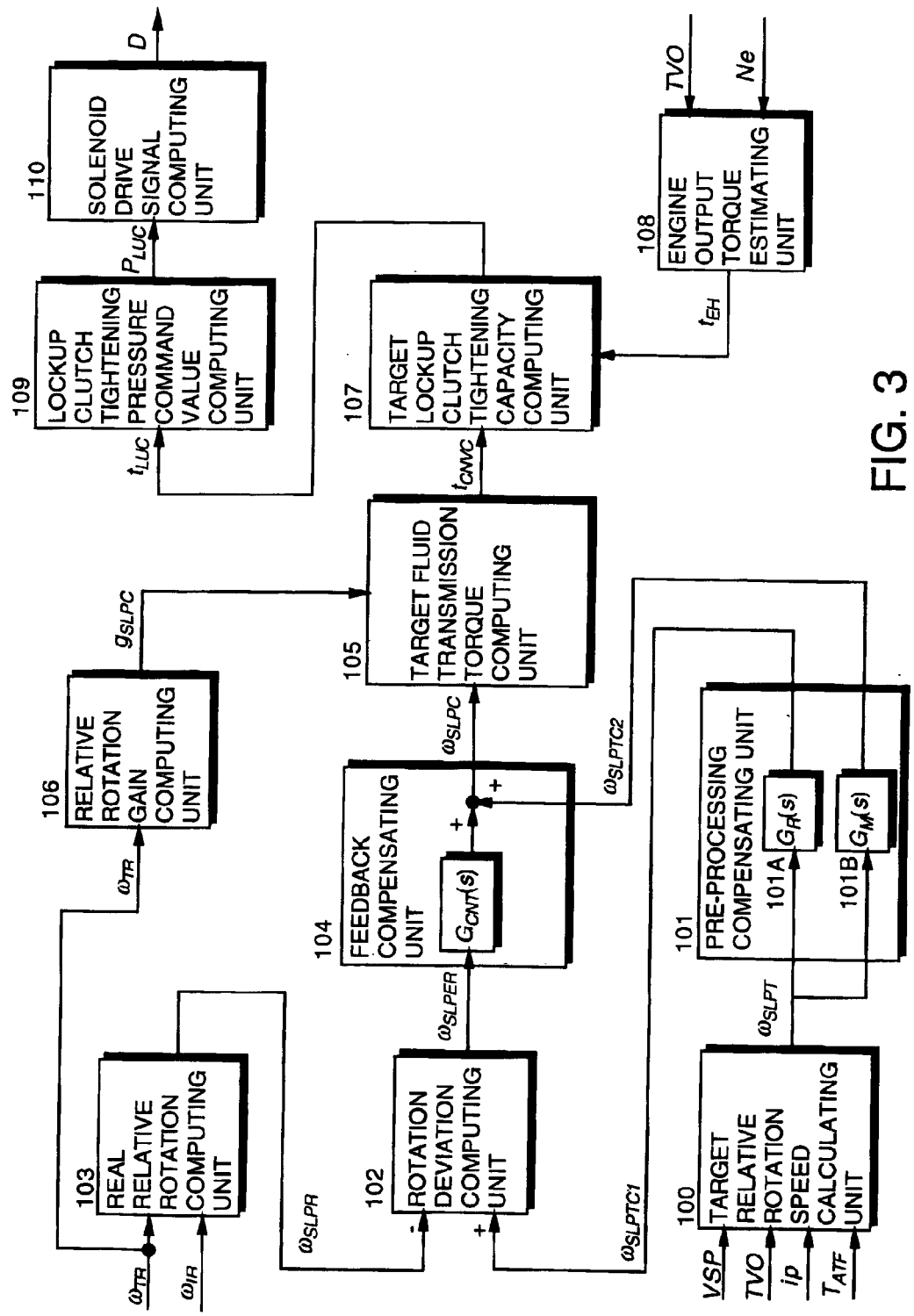
FIG. 3 is a block diagram describing a feedback/feedforward functions of a controller according to this invention.

Next, referring to FIG. 3, the feedback/feedforward control function of the differential pressure (PA−PR) of the controller 5 will be described. All the blocks shown in the figure are virtual units for the purpose of describing the function of the controller 12, and do not exist as physical entities.

A target relative rotation speed calculating unit 100 determines a target relative rotation speed $\omega_{SLPT}$ of the pump impeller 1a and turbine runner 1b based on the vehicle speed VSP, throttle opening TVO, gear ratio ip and oil temperature $T_{ATF}$. The target relative rotation speed $\omega_{SLPT}$ is the relative rotation speed which obtains a minimum fluctuation in the engine output torque due to scatter in the combustion of the engine 21 and a minimum pulsation noise emitted by the drive train. The target relative rotation speed $\omega_{SLPT}$ is preset by experiment according to the above parameters.

A real relative rotation computing unit 103 computes a real relative rotation speed $\omega_{SLPR}$ of the torque converter 1 by subtracting the rotation speed $\omega_{TR}$ of the turbine runner 1b from the rotation speed $\omega_{IR}$ of the pump impeller 1a. Herein, the rotation speed of the pump impeller 1a is equivalent to the rotation speed of the engine 21 and the rotation speed of the turbine runner 1b is equivalent to the input rotation speed of the automatic transmission 23.

A pre-processing compensating unit 101 calculates a target relative rotation speed correction values $\omega_{SLPTC1}$ and $\omega_{SLPTC2}$ by processing the target relative rotation speed $\omega_{SLPT}$ with compensation filters so that the target relative rotation speed displays the intended response.

The pre-processing compensating unit 101 comprises a first unit 101A and a second unit 101B. The first unit 101A calculates a first target relative rotation speed correction value $\omega_{SLPTC1}$ from Equation (1) below.

$$\omega_{SLPPTC1} = G_R(S) \cdot \omega_{SLPT}(f) \tag{1}$$

where $$G_R(s) = \text{transfer function of reference model} = \frac{1}{1 + Tc \cdot s},$$

Tc=time constant, and s=differential operator.

Equation (1) corresponds to a first order delay processing.

The second unit 101B calculates a second target relative rotation speed correction value $\omega_{SLPTC2}$ from Equation (2) below.

$$\omega_{SLPTC2} = G_M(S) \cdot 107_{SLPT}(f) \tag{2}$$

where $$G_M(s) = \frac{G_R(s)}{P(s)},$$

$G_M(s)$=transfer function of feedforward compensator, and

P(s)=transfer function with respect to relative rotation model.

A rotation deviation computing unit 102 calculates the deviation $\omega_{SLPER}$ between the first target relative rotation speed $\omega_{SLPTC1}$ and the real relative rotation speed $\omega_{SLPR}$ as follows.

$$\omega_{SLPER} = \omega_{SLPTC1} - \omega_{SLPR} \tag{3}$$

A feedback compensating unit 104 calculates the first relative rotation speed command value $\omega_{SLPC1}$ on the basis of this deviation $\omega_{SLPER}$ using Equation (4) below which represents proportional/integral feedback control.

$$\omega_{SLPC1} = G_{CNT}(s) \cdot \omega_{SLPER} = K_P \cdot \omega_{SLPER} + \frac{K_i}{s} \cdot \omega_{SLPER} \tag{4}$$

where, $G_{CNT}(s)$=transfer function of feedback compensator, $K_p$=proportional gain, $K_i$=integral gain, and s=differential operator.

In addition, the feedback compensating unit 104 calculates a target relative rotation speed command value $\omega_{SLPC}$ by adding the second target relative rotation speed correction value $\omega_{SLPTC2}$ to the first relative rotation speed command value $\omega_{SLPC1}$ in Equation (5) below.

$$\omega_{SLPC} = \omega_{SLPC1} + \omega_{SLPT2} \tag{5}$$

Figure 7:
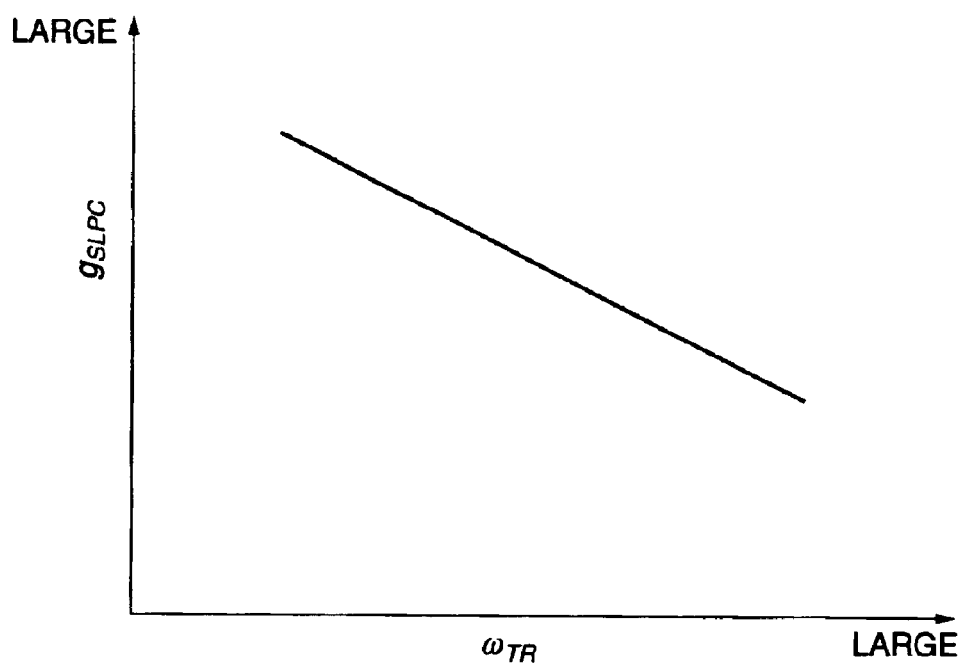
FIG. 7 is a diagram describing the characteristics of a map of a relative rotation gain $g_{SLPC}$ stored by the controller.

A relative rotation gain computing unit 106 uses the rotation speed $\omega_{TR}$ of the turbine runner 1b to calculate the relative rotation gain $g_{SLPC}$ by referring to a map having the characteristics shown in FIG. 7. This map is prestored in the memory (ROM) of the controller 5.

A target fluid transmission torque computing unit 105 calculates a target converter transmission torque $t_{CNVC}$ corresponding to the target relative rotation speed command value $\omega_{SLPC}$ using the relative rotation gain $g_{SLPC}$ using Equation (6) below.

$$t_{CNVC} = \frac{\omega_{SLPC}}{g_{SLPC}} \tag{6}$$

Figure 8:
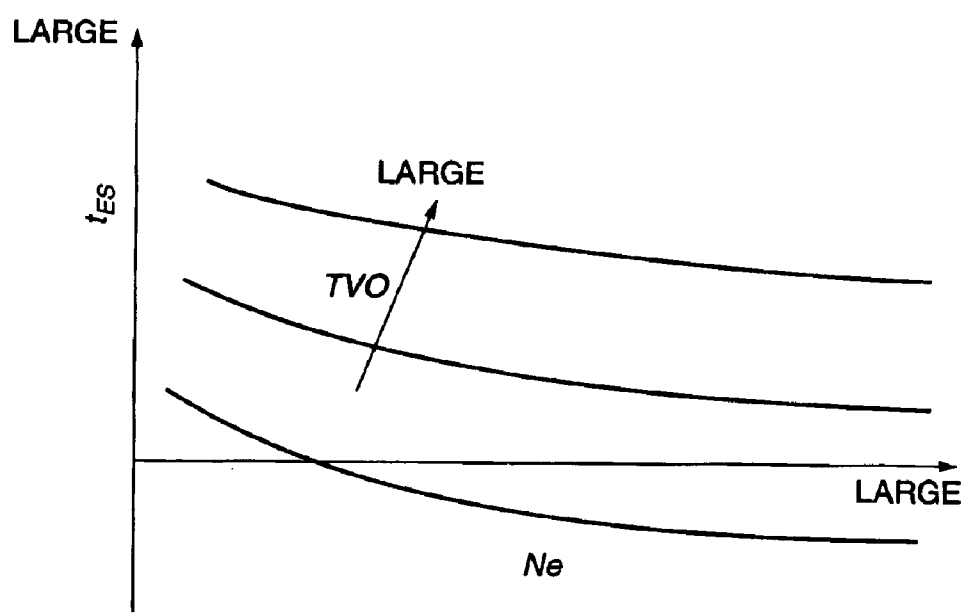
FIG. 8 is a diagram describing the characteristics of a map of an engine output torque $t_{ES}$ stored by the controller.

An engine output torque estimating unit 108 estimates an engine output torque $t_{ES}$ of the engine 21 by referring to a map having the characteristics shown in FIG. 8 based on the engine rotation speed Ne and throttle opening TVO. This map is prestored in the memory (ROM) of the controller 5.

This value is filter processed by Equation (7) below using a time constant $T_{ED}$ taking account of a first order delay of the engine dynamics to obtain an engine torque estimated value $t_{EH}$.

$$t_{EH} = \frac{1}{1 + T_{ED} \cdot s} \cdot t_{ES} \tag{7}$$

A target lockup clutch tightening capacity computing unit 107 computes a target lockup clutch tightening capacity $t_{LUC}$ by subtracting the target fluid transmission torque $t_{CNVC}$ in Equation (6) from the engine output torque estimated value $t_{EH}$ obtained as described above $$t_{LU} = t_{EH} - t_{CNVC} \qquad (8)$$

Figure 9:
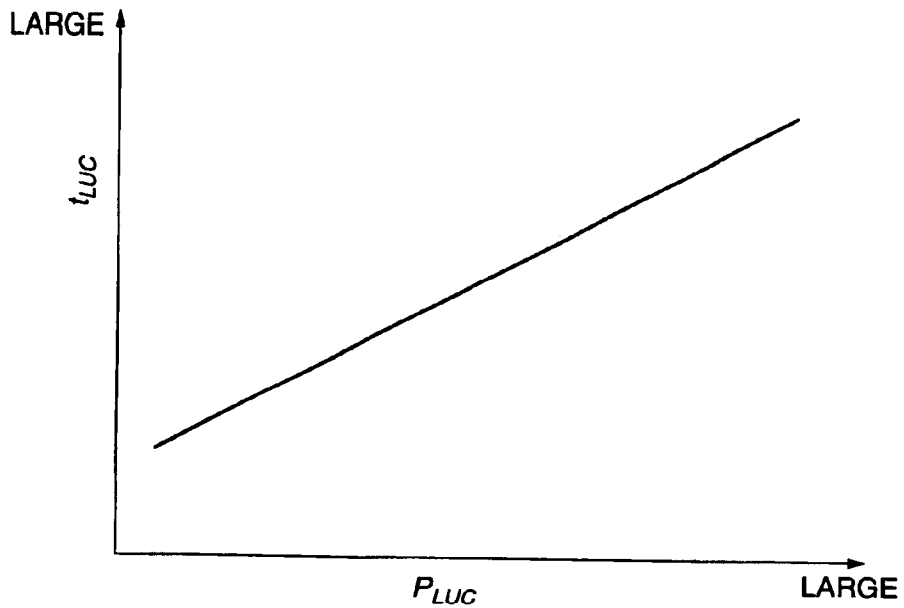
FIG. 9 is a diagram describing the characteristics of a map of a target lockup clutch tightening capacity $t_{LUC}$ stored by the controller.

A lockup clutch tightening pressure command value computing unit 109 calculates a lockup clutch tightening pressure command value $P_{LUC}$ required to achieve the target lockup clutch tightening capacity $t_{LUC}$ by referring to a map having the characteristics shown in FIG. 9. This map is drawn up in advance on the basis of experimental results regarding the relation between the tightening pressure and tightening capacity of the lockup clutch 2, and is prestored in the memory (ROM) of the controller 5.

A solenoid drive signal computing unit 110 calculates a lockup duty $S_{DUTY}$ based on the lockup clutch tightening pressure command value $P_{LUC}$, and outputs a corresponding duty signal D to the solenoid valve 4.

Next referring to FIG. 4, a routine for changing over from the open loop control to the feedback/feedforward control will be described. This routine is executed by the controller 5 at intervals of ten milliseconds when the engine 21 is operating.

Figure 4:
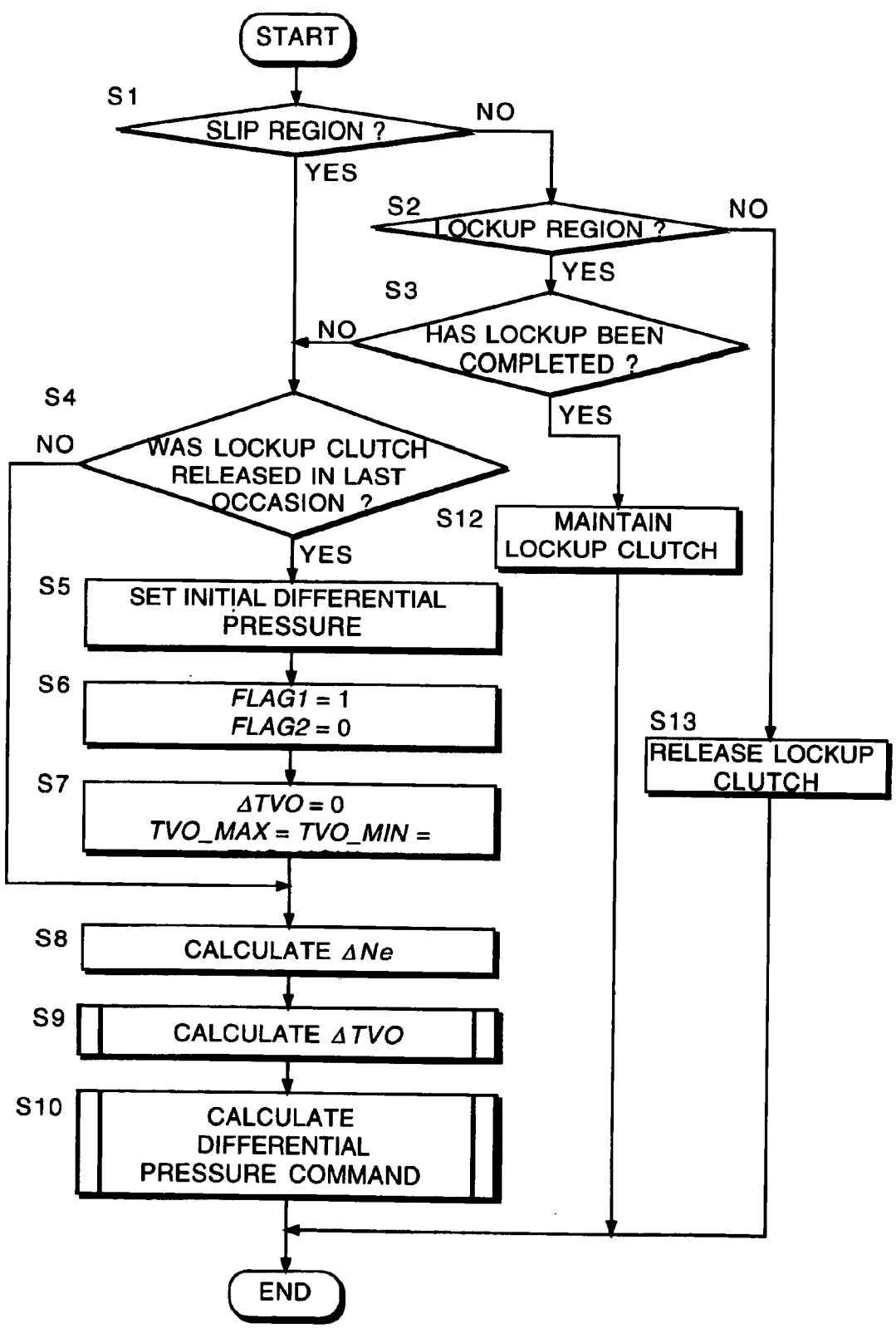
FIG. 4 is a flowchart describing a routine for controlling a differential pressure in the lockup clutch performed by the controller.

Referring to FIG. 4, in a first step S1, the controller 5 determines whether or not the running condition of the vehicle corresponds to the slip region of the torque converter 2. Herein, the slip region corresponds to a region where the vehicle speed VSP is within a predetermined range while the throttle opening TVO is not larger than a predetermined opening TVO1.

When, in the step S1, the vehicle running condition corresponds to the slip region, the controller 5 performs the processing of a step S4. When the vehicle running condition does not correspond to the slip region, the controller 5 determines in a step S2 whether the vehicle running condition corresponds to the lockup region.

When the vehicle running condition does not correspond to the slip region, it must correspond to the lockup region or converter region. In the step S2, when the vehicle speed VSP is less than a predetermined vehicle speed, it is determined that the running condition corresponds to the converter region, and if the vehicle speed is not less than the predetermined vehicle speed, it is determined that the running condition corresponds to the lockup region. The predetermined vehicle speed is herein set to five kilometers per hour (5 km/hr). When the running condition does not correspond to the lockup region in the step S2, in other words, when it corresponds to the converter region, the controller 5 releases the lockup clutch 2 in a step S13.

Specifically, the differential pressure (PA−PR) is controlled so that the application pressure PA is lower than the release pressure PR. As a result, the output rotation of the engine 21 is exclusively transmitted to the automatic transmission 23 via the fluid in the torque converter 2. After the processing of the step S13, the controller 5 terminates the routine.

If the running condition corresponds to the lockup region in the step S2, in a step S3, the controller 5 determines whether or not the lockup operation of the lockup clutch 2 has been completed. In other words, it determines if the differential pressure (PA−PR) of the lockup clutch 2 has reached a predetermined lockup differential pressure. As the differential pressure (PA−PR) is produced as a result of the duty signal D which the controller 5 outputs to the solenoid valve 4, the differential pressure (PA−PR) is a value known by the controller 5.

When the differential pressure (PA−PR) has reached the predetermined lockup differential pressure in the step S3, the lockup clutch 2 is locked up. In this case, in a step S12, the controller 5 maintains the differential pressure (PA−PR) at the lockup differential pressure. As a result, the output rotation of the engine 21 is transmitted to the automatic transmission 23 via the lockup clutch 2 in the lockup state. After the processing of the step S12, the controller 5 terminates the routine.

When the differential pressure (PA−PR) has not reached the predetermined lockup differential pressure in the step S3, it means that the lockup clutch 2 has not yet been locked up. In this case, the controller 5 performs the processing of the step S4 as in the case where the running condition corresponds to the slip region.

In the step S4, the controller 5 determines whether the processing of the converter region, i.e., the release processing of the lockup clutch 2 of the step S13, was performed on the immediately preceding occasion the routine was executed. In other words, it is determined whether or not the processing of the step S4 is performed for the first time since the vehicle speed VSP exceeded 5 km/hour in the step S1.

Figure 10:
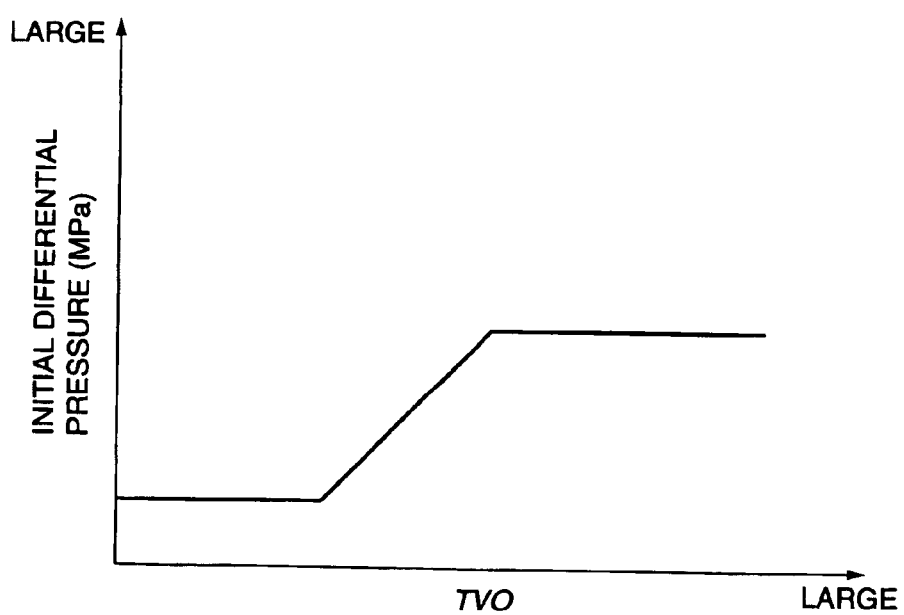
FIG. 10 is a diagram describing the characteristics of a map of an initial differential pressure of the lockup clutch stored by the controller.

If the processing of the converter region was performed on the immediately preceding occasion the routine was executed, in a step S5 the controller 5 sets an initial differential pressure of the lockup clutch 2 form the throttle opening TVO detected by the throttle opening sensor 10 by looking up a map having the characteristics shown in FIG. 10. This map is prestored in the memory (ROM) of the controller 5.

In a next step S6, the controller 5 sets an open-loop control flag FLAG1 to unity and resets a feedforward control cessation flag FLAG2 to zero. The open-loop control flag FLAGS is a flag which shows whether or not open loop control of the differential pressure of the lockup clutch 2 is performed, and its initial value is zero. The feedforward control cessation flag FLAG2 is a flag which shows whether or not the feedforward compensator in Equation (2) is applied. When the flag FLAG2 is unity, it means that the feedforward compensator is not applied, and the second target relative rotation speed correction value $\omega_{SLPTC2}$ which is added to the first relative rotation speed command value $\omega_{SLPC1}$ in the feedback compensating unit 104 to calculate the target relative rotation speed command value $\omega_{SLPC}$ maintained at zero.

In a next step S7 a throttle opening variation amount ΔTVO is reset to zero, and a registered maximum throttle opening TVO_MAX and a registered minimum throttle opening TVO_MIN which are both set equal to a current throttle opening TVO_NOW that is the newest value of throttle valve opening TVO measured by the throttle opening sensor 10. These values related to the throttle opening TVO will be described later.

After the processing of the step S7, the controller performs the processing of a step S8.

If on the other hand, the release processing of the lockup clutch 2 of the step S13, was not performed on the immediately preceding occasion the routine was executed, the controller 5 skips over the steps S5–S7 and performs the processing of the step S8.

The processing of the step S5–S7 is therefore performed only once immediately after the running condition of the vehicle has become into the slip region of the torque converter 2

In the step S8, the controller 5 calculates an engine rotation speed variation rate ΔNe by Equation (9) below:

$$\Delta Ne = Ne - Ne_{-100} \qquad (9)$$

where, $Ne_{-100}$=Ne measured at a hundred milliseconds ago.

As can be understood from Equation (9), the engine rotation speed variation rate ΔNe is the variation in the engine rotation speed within the previous hundred milliseconds.

Figure 6:
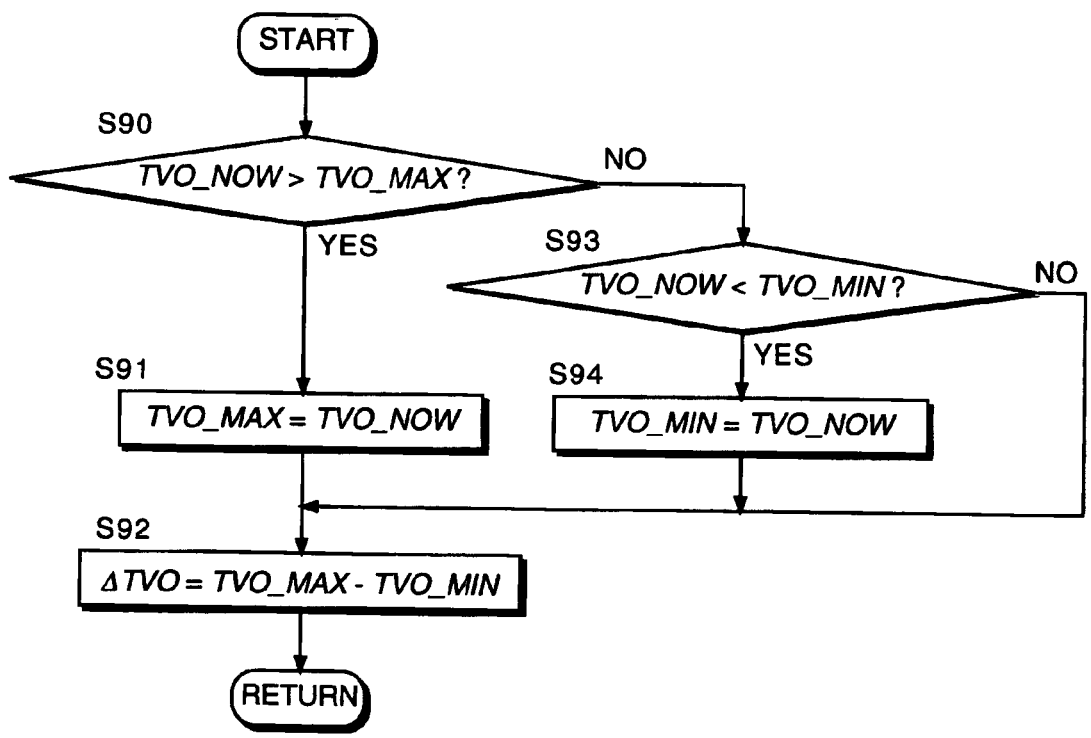
FIG. 6 is a flowchart describing a subroutine for calculating a throttle opening variation amount ΔTVO performed by the controller.

In a next step S9, the controller calculate the throttle opening variation amount ΔTVO by a subroutine shown in FIG. 6.

Referring to FIG. 6, in a first step S90, the controller 5 compares the current throttle opening TVO_NOW with the registered maximum throttle opening TVO_MAX.

When TVO_NOW is larger than TVO_MAX, in a step S91, the controller updates the value of TVO_MAX by TVO_NOW.

When TVO_NOW is not larger than TVO_MAX, in a step S93, the controller 5 compares the current throttle opening TVO_NOW with the registered minimum throttle opening TVO_MIN.

When TVO_NOW is smaller than TVO_MIN, in a step S94, the controller 5 updates the value of TVO_MIN by TVO_NOW.

When TVO_NOW is not smaller than TVO_MIN, or after the processing of the step S91 or S94, in a step S92, the controller 5 calculates the throttle opening variation ΔTVO by Equation (10) below.

$$\Delta TVO = TVO\_MAX - TVO\_MIN \quad (10)$$

Considering the values of TVO_MAX and VO_MIN are set equal to TVO_NOW in the step S7 of FIG. 4, the throttle opening variation ΔTVO is a value representing the maximum variation in the throttle opening TVO after the running condition of the vehicle has entered the slip region of the torque converter 1.

Figure 5:
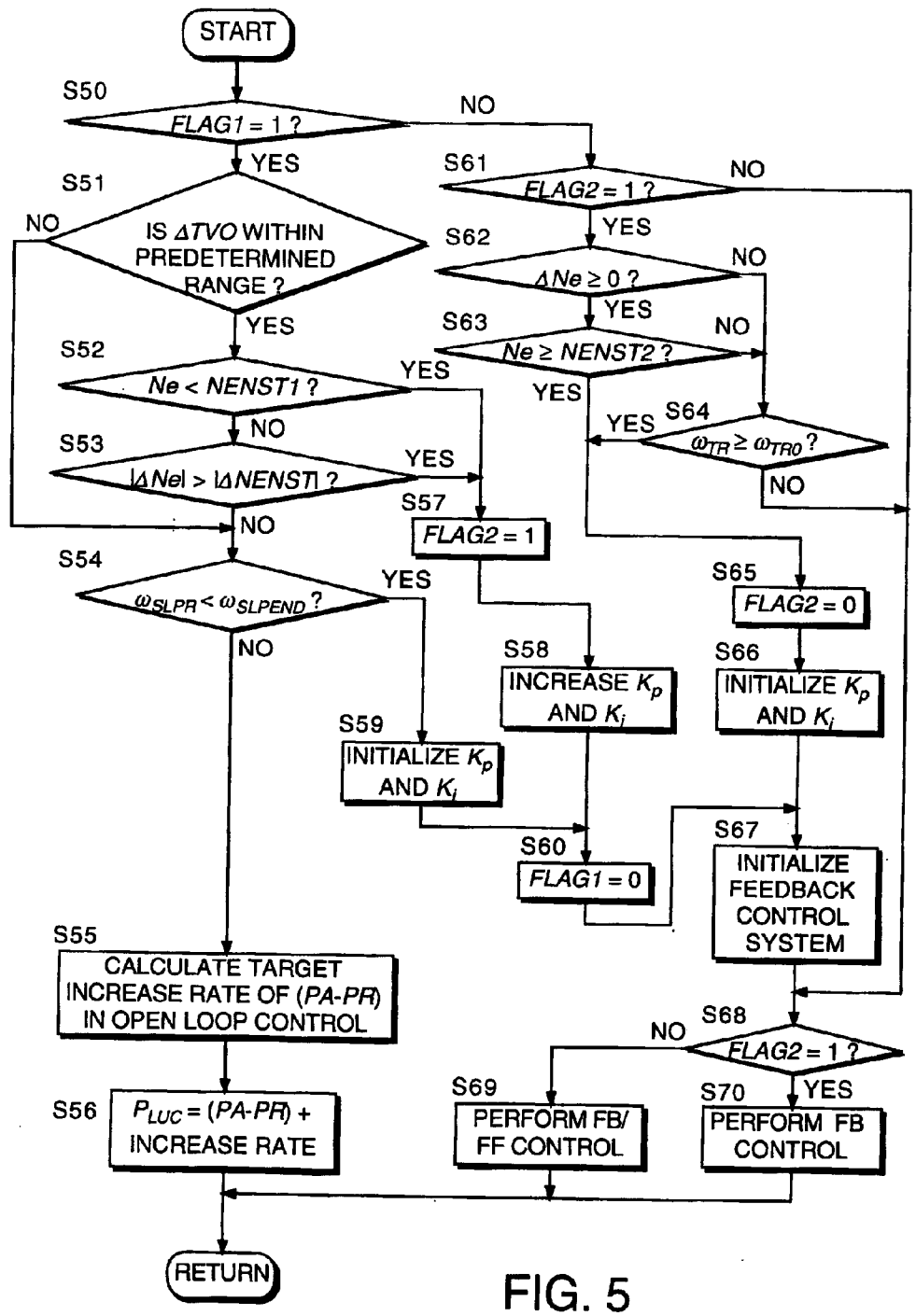
FIG. 5 is a flowchart describing a subroutine for calculating a differential pressure command value performed by the controller.

Referring again to FIG. 4, after calculating the throttle opening variation ΔTVO in the step S9, the controller 5 executes a subroutine shown in FIG. 5 to calculate a differential pressure command value in a next step S10.

Referring to FIG. 5, in a first step S50, the controller 5 determines whether or not the open-loop control flag FLAG1 is unity. When FLAG1 is unity, that is, open-loop control of the differential pressure (PA–PR) is currently performed, the controller 5 performs the processing of a step S51. When FLAG is not unity, that is, open-loop control of the differential pressure (PA–PR) is currently not performed, the controller 5 performs the processing of a step S61.

In the step S51, the controller 5 compares the throttle opening variation ΔTVO with a predetermined throttle opening. As long as the throttle opening variation ΔTVO is not larger than the predetermined throttle opening, it is considered that the engine rotation speed variation due to a cause other then the differential pressure control, e.g., an engine torque fluctuation, is not found, and the controller 5 performs the processing of a step S52. When on the other hand, ΔTVO is larger than the predetermined throttle opening, it is considered that the engine rotation speed variation is promoted not only by the differential pressure control but also by other cause, and the controller 5 performs the processing of a step S54.

Figure 13:
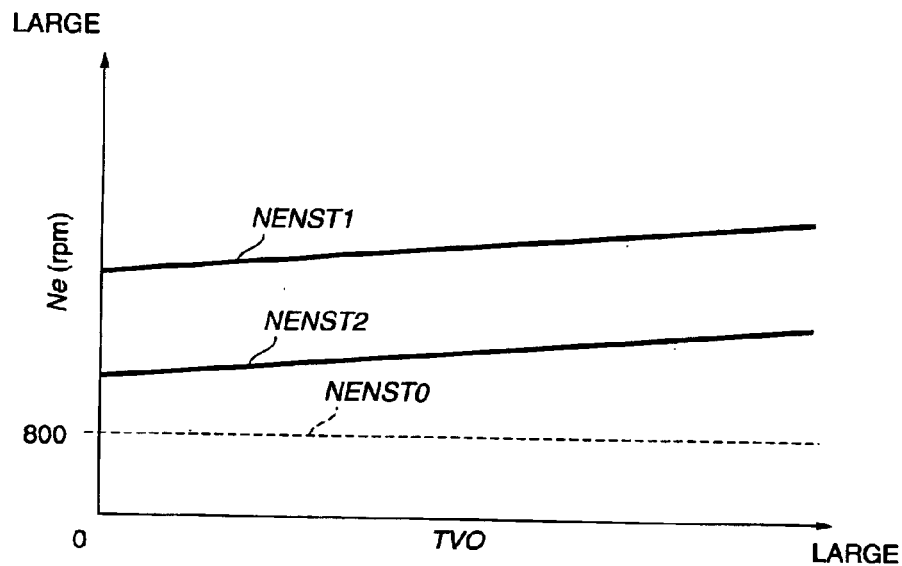
FIG. 13 is a diagram describing the characteristics of a map of a predetermined engine-stall prevention speed NENST1 and a predetermined engine-stall prevention termination speed NENST2 stored by the controller.

In the step S52, it is determined whether or not the engine rotation speed Ne is smaller than a predetermined engine-stall prevention speed NENST1. The value of NENST1 is determined from the throttle opening TVO by referring to a map of which the characteristics are shown in FIG. 13. This map is prestored in the memory (ROM) of the controller 5. In the figure, an engine-stall critical speed at which the lockup clutch is automatically released in order to prevent the engine from stalling is shown by a broken line which corresponds to about 800 revolutions per minute (rpm). The predetermined engine-stall prevention speed NENST1 is set 100 rpm to 200 rpm larger than the engine-stall critical speed according to the throttle valve opening TVO.

When the engine rotation speed Ne is smaller than the predetermined engine-stall prevention speed NENST1 in the step S52, it is determined that the engine 21 may stall, and the controller 5 performs the processing of steps S57 and S58 so as to prevent the engine 21 from stalling.

When the engine rotation speed Ne is not smaller than the predetermined engine-stall prevention speed NENST1, it is determined that there is no possibility that the engine 21 stalls, and the controller 5 performs the processing of a step S53.

In the step S53, the controller 5 compares the engine rotation speed variation rate ΔNe with a predetermined engine-stall prevention rate ΔNENST.

Figure 14:
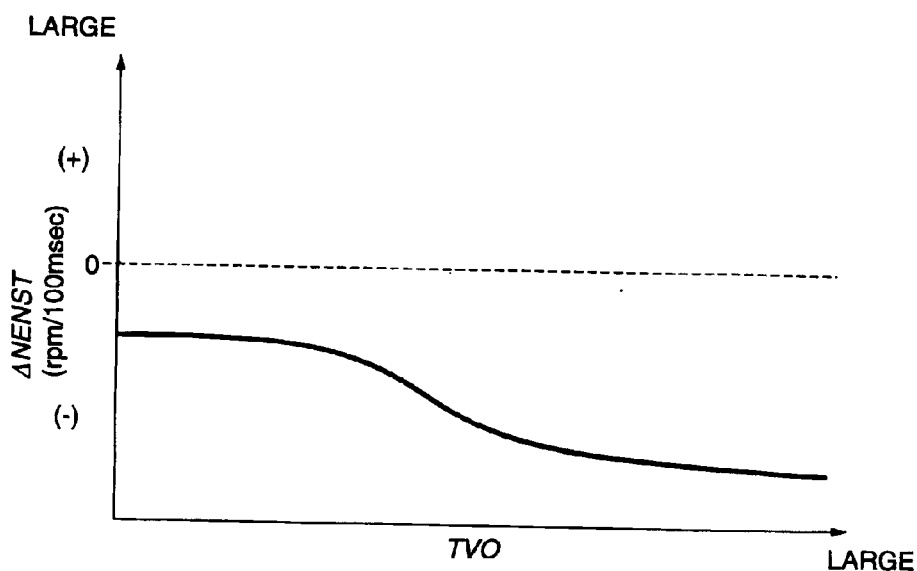
FIG. 14 is a diagram describing the characteristics of a map of a predetermined engine-stall prevention rate ΔNENST stored by the controller.

Herein, the predetermined engine-stall prevention rate ΔNENST is determined from the throttle opening TVO by referring to a map having the characteristics shown in FIG. 14. This map is also prestored in the memory (ROM) of the controller 5. As shown in the figure, ΔNENST is set to a negative value. When the engine rotation speed is decreasing, the engine rotation speed variation rate ΔNe also takes a negative value. The comparison in the step S53 is therefore performed using the absolute values.

When |ΔNe| is not larger than |ΔNENST|, it is determined that there is no possibility that the engine 21 stalls and the controller 5 performs the processing of the step S54

When |ΔNe| is larger than |ΔNENST|, it is determined that the engine 21 may stall, and the controller 5 performs the processing of the steps S57 and S58 so as to prevent the engine 21 from stalling.

Figure 11:
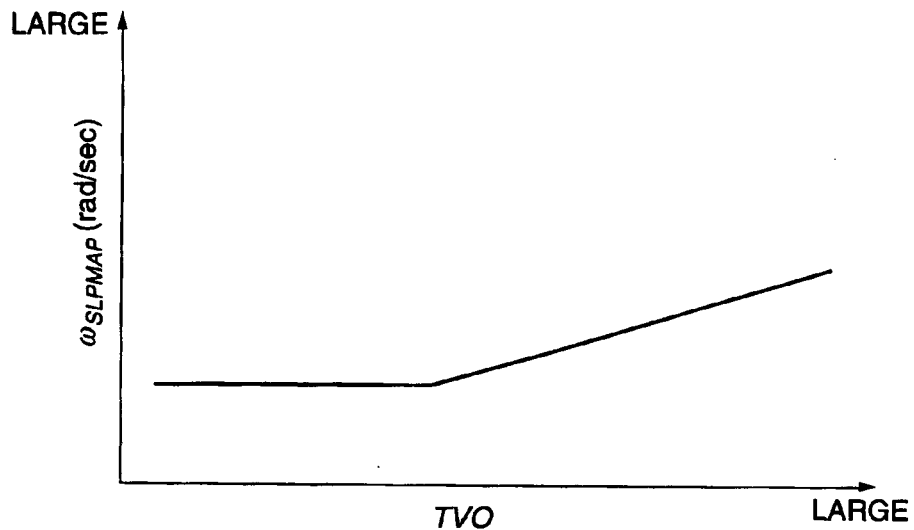
FIG. 11 is a diagram describing the characteristics of a map of a predetermined open-loop control end relative rotation speed $\omega_{SLPEND}$ stored by the controller.

In the step S54, the controller 5 determines if the open loop control of the differential pressure (PA–PR) may be terminated. The determination is performed by comparing the real relative rotation speed $\omega_{SLPR}$ of the torque converter 2 with a predetermined open-loop control end relative rotation speed $\omega_{SLPEND}$. The predetermined open-loop control end relative rotation speed $\omega_{SLPEND}$ is obtained from the throttle opening TVO by referring to a map having the characteristics shown in FIG. 11. This map is prestored in the memory (ROM) of the controller 5.

When $\omega_{SLPR}$ is not smaller than $\omega_{SLPEND}$, it is determined that the vehicle running condition is still the open-loop control region of the differential pressure (PA–PR), and the controller 5 performs the processing of steps S55 and S56.

Figure 12:
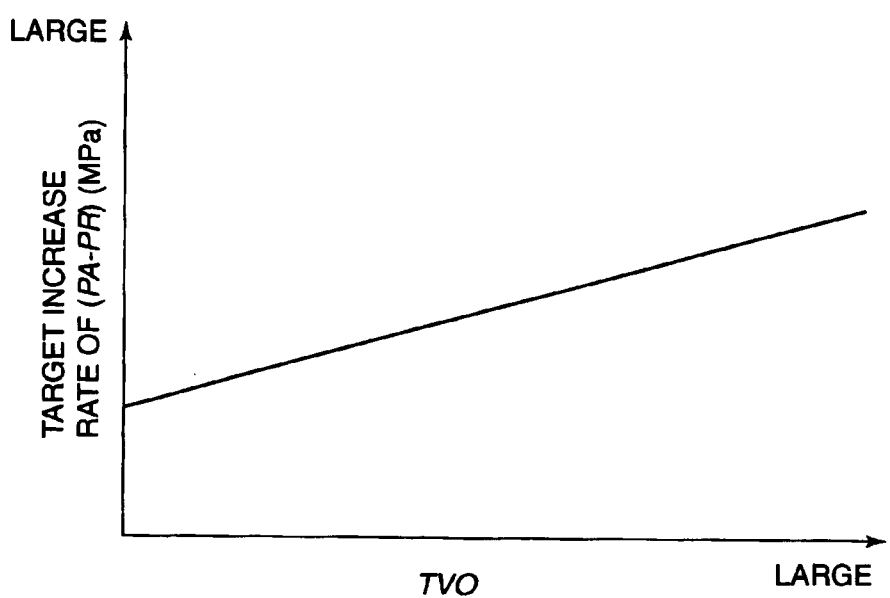
FIG. 12 is a diagram describing the characteristics of a map of a target increase rate of the differential pressure (PA−PR) stored by the controller.

In the step S55, the controller 5 calculates a target increase rate of the differential pressure (PA–PR) in open loop control. This calculation is performed by looking up a map having the characteristics shown in FIG. 12 from the throttle opening TVO. This map is prestored in the memory (ROM) of the controller 5.

In the next step S56, the controller 5 sets a value obtained by adding the target increase rate to the present differential pressure (PA–PR) as a target differential pressure $P_{LUC}$, and outputs a duty signal D corresponding to the target differential pressure $P_{LUC}$ to the solenoid valve 4. After the processing of the step S56, the controller 5 terminates the routine.

When on the other hand, $\omega_{SLPR}$ is smaller than $\omega_{SLPEND}$, it is determined that the vehicle running condition has changed to the feedback/feedforward control region, and the controller 5 initializes the feedback control gains $K_p$ and $K_i$ in a step S59. The values of these gains are initialized to pre-designed values determined in consideration of control stability. After initializing the feedback control gains $K_p$ and $K_i$, the controller performs the processing of a step S60.

When it is determined that the engine 21 may stall in the step S52 or S53, the controller 5 performs the processing of the steps S57 and S58 and then proceeds to the processing of the step S60.

In the step S57, the controller 5 sets the feedforward control cessation flag FLAG2 to unity. By setting the feedforward control cessation flag FLAG2 to unity, feedforward control of the differential pressure (PA−PR) is substantially not performed in the subsequent steps.

Figure 15:
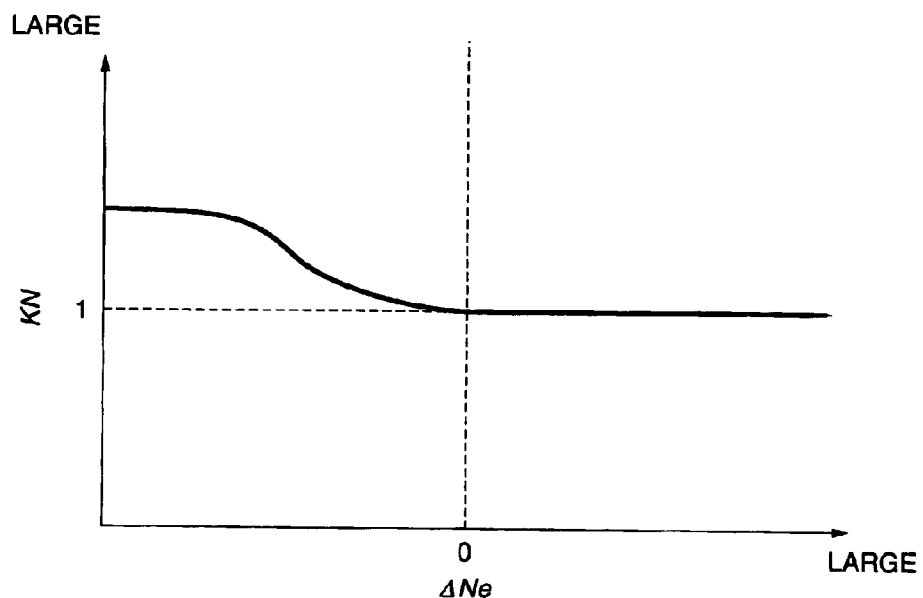
FIG. 15 is a diagram describing the characteristics of a map of a feedback gain increase coefficient KN stored by the controller.

In the next step S58, the controller 5 determines a feedback gain increase coefficient KN from the engine rotation speed variation rate ΔNe by referring to a map having the characteristics shown in FIG. 15. This map is prestored in the memory (ROM) of the controller 5.

According to this map, when the engine rotation speed variation rate ΔNe is a negative value and becomes larger, in other words, when the engine rotation speed rapidly falls, the feedback gain increase coefficient KN takes a larger value. The feedback gain increase coefficient KN is multiplied to the feedback control gains $K_p$ and $K_i$. Increasing the feedback control gains $K_p$ and $K_i$ in this way has an effect to prevent the engine rotation speed Ne from falling. The steps S57 and S58 are the steps for preventing the engine rotation speed from falling.

After the processing of the step S58, the controller 5 performs the processing of the step S60, as in the case where the change-over from open-loop control to feedback/feedforward control is performed without a large fall in the engine rotation speed.

In the step S60, the controller 5 resets the open-loop control flag FLAG1 to zero.

After performing the processing of the step S60, the controller 5 performs the processing of a step S67.

In the step S67, the controller 5 initializes the feedback control system.

Specifically, the controller 5 initializes the outputs of the first unit 101A and the second unit 101B using the real relative rotation speed $\omega_{SLPR}$ when control is changed over from open loop control to feedback/feedforward control. In other words, the first target relative rotation speed correction value $\omega_{SLPTC1}$, and the second target relative rotation speed correction value $\omega_{SLPTC2}'$ are both set equal to the real relative rotation speed $\omega_{SLPR}$. The controller 5 also initializes the output $\omega_{SLPC1}$ of the feedback compensator in the feedback compensating unit 104 to zero. As a result, the target relative rotation speed command value $\omega_{SLPC}$ is initialized to the real relative rotation speed $\omega_{SLPR}$.

In a next step S68, the controller 5 determines whether or not the feedforward control cessation flag FLAG2 is unity.

When the feedforward control cessation flag FLAG2 is not unity, i.e., zero, in a step S69, the controller 5 performs ordinary feedback/feedforward control of the differential pressure (PA−PR) as described above with reference to FIG. 3. After the processing of the step S69, the controller 5 terminates the subroutine.

When the feedforward control cessation flag FLAG2 is unity, in a step S70, the controller 5 performs feedback/feedforward control of the differential pressure (PA−PR) with the second target relative rotation speed correction value $\omega_{SLPTC2}$ set to zero. In other words, the feedforward control is substantially not performed and the differential pressure (PA−PR) is controlled solely by the feedback control. After the processing of the step S70, the controller 5 terminates the subroutine.

As described above, when the control of the differential pressure (PA−PR) is changed over from open loop control to feedback/feedforward control, the processing of the step S59, S60, S67 or the processing of the step S57, S58, S60, S67 is performed preceding the start of the feedback/feedforward control of the differential pressure (PA−PR).

After the feedback/feedforward control of the differential pressure (PA−PR) is started, the open-loop control flag FLAG1 is not unity, and the determination result in the step S50 is negative. In this case, the controller 5 determines in the step S61 whether or not the feedforward control cessation flag FLAG2 is unity.

When the feedforward control cessation flag FLAG2 is not unity, the controller 5 performs the feedback/feedforward control of the differential pressure (PA−PR) in the step S69 via the step S68.

When the feedforward control cessation flag FLAG2 is unity, the controller 5 determines in steps S62–S64 whether or not feedforward control conditions of the differential pressure (PA−PR) are satisfied.

In the step S62, the controller 5 determines whether or not the engine rotation speed variation rate ΔNe is equal to or greater than zero, in other words, the engine rotation speed variation rate ΔNe is not a negative value. When ΔNe is equal to or greater than zero, in the step S63, the controller 5 determines whether of not the engine rotation speed Ne is equal to or greater than a predetermined engine-stall prevention termination speed NENST2.

The predetermined engine-stall prevention termination speed NENST2 is given by a map of which the characteristics are shown in FIG. 13. The predetermined engine-stall prevention termination speed NENST2 is set according to the throttle opening TVO as in the case of the predetermined engine-stall prevention speed NENST1. As shown in the figure, NENST2 is set to value a predetermined value smaller than NENST1.

When the engine rotation speed Ne is equal to or greater than the predetermined engine-stall prevention termination speed NENST2, the controller 5 performs the processing of steps S65 and S66 which is a preprocessing before proceeding to the feedforward control of the differential pressure (PA−PR).

When the engine rotation speed variation rate ΔNe is a negative value in the step S62, or when the engine rotation speed Ne is smaller than the predetermined engine-stall prevention termination speed NENST2 in the step S63, the controller 5 performs the processing of a step S64.

Figure 16:
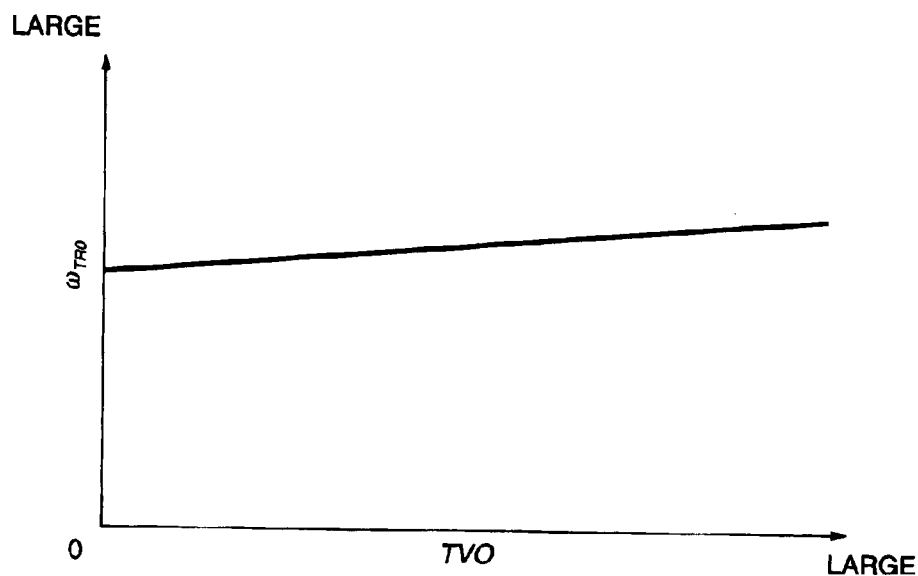
FIG. 16 is a diagram describing the characteristics of a map of a predetermined turbine runner speed $\omega_{TR0}$ stored by the controller.

In the step S64, the controller determines whether or not the rotation speed $\omega_{TR}$ of the turbine runner 1b is equal to or greater than a predetermined turbine runner speed $\omega_{TR0}$. Herein, the predetermined turbine runner speed $\omega_{TR0}$ is determined from the throttle opening TVO by referring to a map having characteristics shown in FIG. 16. The map is prestored in the memory (ROM) of the controller 5. According to this map, the predetermined turbine runner speed $\omega_{TR0}$ increases as the throttle opening TVO increases.

When feedforward control is prevented in the feedback/feedforward control of the differential pressure (PA−PR) for a long time, although a rapid fall of the engine rotation speed is prevented, deficiency in the differential pressure or retardation of the lockup timing of the lockup clutch 2 may occur. In order to avoid such an adverse effect on the engagement of the lockup clutch 2, the step S64 is applied to forcibly start feedforward control of the differential pressure (PA−PR) when the rotation speed $\omega_{TR}$ of the turbine runner 1b is equal to or greater than the predetermined turbine runner speed $\omega_{TR0}$.

When the rotation speed $\omega_{TR}$ of the turbine runner 1b is equal to or greater than the predetermined turbine runner speed $\omega_{TR0}$ in the step S64, the controller 5 performs the processing of the steps S65 and S66. When the rotation speed $\omega_{TR}$ of the turbine runner 1b is smaller than the predetermined turbine runner speed $\omega_{TR0}$ in the step S64, the controller 5 performs the feedback/feedforward control of the differential pressure (PA–PR) with the second target relative rotation speed correction value $\omega_{SLPTC2}$ set to zero in the step S70 via the step S68.

In the step S65, the controller 5 resets the feedforward control cessation flag FLAG2 to zero.

In the next step S66, the controller 5 initializes the feedback control gains $K_p$ and $K_i$ to the pre-designed values as in the processing of the step S59. With these feedback control gains $K_p$ and $K_i$, the controller 5 performs the processing of the step S67 described above and thereafter performs ordinary feedback/feedforward control of the differential pressure (PA–PR) in the step S69.

Next, referring to FIGS. 17A–17F, the results of the above lockup control by the controller 5 will be described.

At a time t1, the lockup control of the lockup clutch 2 is started applying open loop control as shown in FIG. 17F. Open loop control has an object of raising the differential pressure (PA–PR) to a level at which the relative rotation speed of the pump impeller 1a and turbine runner 1b responds to the differential pressure (PA–PR) at a good response so as to smoothly perform the subsequent differential pressure control.

In an ordinary engagement of the lockup clutch 2, the differential pressure control is changed over form open loop control to feedback/feedforward control when the real relative rotation speed $\omega_{SLPR}$ has reached the predetermined open-loop control end relative rotation speed $\omega_{SLPEND}$.

However, there is a possibility where the engine rotation speed Ne falls below the predetermined engine-stall prevention speed NENST1 during open loop control as shown in FIG. 17A due to a sudden change in the engine output torque, for example. In this case, the controller 5 changes over the differential pressure control from open loop control to feedback/feedforward control even if the real relative rotation speed $\omega_{SLPR}$ is smaller than the predetermined open-loop control end relative rotation speed $\omega_{SLPEND}$.

As a result, at a time t2, feedback/feedforward control of the differential pressure (PA–PR) is started as shown in FIG. 17C. In this case, however, since the feedforward control cessation flag FLAG2 is set to unity in the step S57, feedforward control of the differential pressure (PA–PR) is substantially not performed as shown in FIG. 17B. In other words, control of the differential pressure (PA–PR) is performed only through the feedback process, so the interference between feedforward control and feedback control does not occur. Further, the feedback control gains $K_p$ and $K_i$ are increased by applying the feedback gain increase coefficient KN in the step S58. As a result, the lockup clutch tightening pressure command value $P_{LUC}$ is promptly decreased as long as the target relative rotation speed $\omega_{SLPT}$ is larger than the real relative rotation speed d $\omega_{SLPR}$.

Due to this control, the fall in the engine rotation speed Ne is soon stopped and at a time t3, the engine rotation speed Ne resumes to increase.

At the time t3, when the engine rotation speed variation rate ΔNe takes a positive value, the controller 5 starts to apply feedforward control of the differential pressure (PA–PR). At the same time, the controller 5 initializes the feedback control gains $K_p$ and $K_i$ to the pre-designed value, and initialize the target relative rotation speed command value $\omega_{SLPC}$ to the real relative rotation speed $\omega_{SLPR}$, so that the first relative rotation speed command value $\omega_{SLPC1}$ starts from zero. This arrangement helps in the suppression of fluctuation in the rotation speed $\omega_{TR}$ of the turbine runner 1b.

In FIG. 17A, a dotted line shows an engine rotation speed which is obtained by adding the predetermined open-loop control end relative rotation speed $\omega_{SLPEND}$ to the target rotation speed $\omega_{TR}$ of the turbine runner 1b. According to the prior art control, the change over from open loop control to feedback/feedforward control of the differential pressure (PA–PR) does not take place until the engine rotation speed Ne falls to the rotation speed specified by the dotted line. As a result the timing of change-over is delayed and the engine rotation speed Ne may further fall during the delay period. According to this invention, however, since the change-over takes place when the engine rotation speed Ne falls below the predetermined engine-stall prevention speed NENST1 in the step S52, the change-over timing from open loop control to feedback/feedforward control is advanced with respect to the prior art control. Further, feedforward control is suspended until the fall of the engine rotation speed is stopped.

Due to this arrangement, it is possible to prevent the engine rotation speed Ne from falling below the engine-stall critical speed at which the lockup clutch is automatically released to prevent the engine from stalling.

After the time t3, the engine rotation speed Ne increases, so normal feedforward/feedback control of the differential pressure (PA–PR) is performed as shown in FIGS. 17B and 17C.

At a time t5 when the differential pressure (PA–PR) reaches the predetermined lockup differential pressure, the controller 5 terminates the feedback/feedforward control of the differential pressure (PA–PR) and thereafter the differential pressure (PA–PR) is maintained at the predetermined lockup differential pressure.

FIGS. 18A–18F show a case where the change-over from open loop control to feedback/feedforward control of the differential pressure (PA–PR) takes place due to the engine rotation speed variation rate ΔNe succeeded the predetermined engine-stall prevention rate ΔNENST.

In this case, although the engine rotation speed Ne is still larger than the predetermined engine-stall prevention speed NENST1, the change-over condition is satisfied in the step S53, and the change-over takes place earlier than in the situation of FIGS. 17A–17F.

The contents of Tokugan 2003-035176, with a filing date of Feb. 13, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment described above, in the step S62, the engine rotation speed variation rate ΔNe is compared with zero in order to determine if the engine rotation speed has resumed to increase. However, the engine rotation speed variation rate ΔNe may be compared with a value larger than zero to avoid an erroneous determination.

In the above embodiment, the parameters required for control are detected using sensors, but this invention can be applied to any lockup control device which can perform the claimed control using the claimed parameters regardless of how the parameters are acquired.

The embodiments of this invention in which an exclusive property or privilege is claimed are defined as follows:

1. A lockup control device for a lockup clutch of a torque converter for a vehicle, the torque converter comprising a pump impeller connected to an engine and a turbine runner connected to an automatic transmission, and transmitting a torque between the pump impeller and the turbine runner via a fluid and the lockup clutch according to an engaging force of the lockup clutch, the device comprising:

a mechanism which regulates the engaging force;

a sensor which detects a rotation speed of the pump impeller, the rotation speed of the pump impeller being equal to an engine rotation speed;

a sensor which detects a rotation speed of the turbine runner;

a sensor which detects a running condition of the engine; and a programmable controller programmed to:

calculate a real relative rotation speed of the pump impeller and the turbine runner from the rotation speed of the pump impeller and the rotation speed of the turbine runner;

determine a target relative rotation speed based on the running condition of the engine;

perform a feedback control of the mechanism based on a difference between the target relative rotation speed and the real relative rotation speed to cause the difference to decrease;

perform a feedforward control of the mechanism in an increasing direction of the engaging force based on a predetermined feedforward control value, in combination with the feedback control;

determine from the engine rotation speed whether or not the engine is in a predetermined engine-stall prevention condition; and prohibit the feedforward control from being performed when the engine is in the predetermined engine-stall prevention condition.

2. The lockup control device as defined in claim 1, wherein the controller is further programmed to determine that the engine is in the predetermined engine-stall prevention condition when the engine rotation speed falls below a predetermined engine-stall prevention speed.

3. The lockup control device as defined in claim 1, wherein the controller is further programmed to calculate an engine rotation speed decrease rate from the engine rotation speed, and determine that the engine is in the predetermined engine-stall prevention condition when the engine rotation speed decrease rate exceeds a predetermined engine-stall prevention rate.

4. The lockup control device as defined in claim 1, wherein the controller is further programmed to determine if the engine rotation speed has started to increase, and terminate a prohibition of the feedforward control when the engine rotation speed has started to increase.

5. The lockup control device as defined in claim 4, wherein the controller is further programmed to reset the target relative rotation speed equal to the real relative rotation speed when the prohibition of the feedforward control is terminated.

6. The lockup control device as defined in claim 1, wherein the controller is further programmed to increase a feedback control applied to the feedback control during a period when the feedforward control is prohibited.

7. The lockup control device as defined in claim 1, wherein the controller is further programmed to calculate the predetermined feedforward control value from the target relative rotation speed.

8. The lockup control device as defined in claim 1, wherein the controller is further programmed to perform an open loop control of the mechanism to increase the engaging force prior to perform the feedback control, and change over from the open loop control to the feedback control when the real relative rotation speed has reached a predetermined open-loop control end relative rotation speed.

9. A lockup control device for a lockup clutch of a torque converter for a vehicle, the torque converter comprising a pump impeller connected to an engine and a turbine runner connected to an automatic transmission, and transmitting a torque between the pump impeller and the turbine runner via a fluid and the lockup clutch according to an engaging force of the lockup clutch, the device comprising:

means for regulating the engaging force;

means for determining a rotation speed of the pump impeller, the rotation speed of the pump impeller being equal to an engine rotation speed;

means for determining a rotation speed of the turbine runner;

means for determining a running condition of the engine;

means for calculating a real relative rotation speed of the pump impeller and the turbine runner from the rotation speed of the pump impeller and the rotation speed of the turbine runner;

means for determining a target relative rotation speed based on the running condition of the engine;

means for performing a feedback control of the regulating means based on a difference between the target relative rotation speed and the real relative rotation speed to cause the difference to decrease;

means for performing a feedforward control of the regulating means in an increasing direction of the engaging force based on a predetermined feedforward control value, in combination with the feedback control;

means for determining from the engine rotation speed whether or not the engine is in a predetermined engine-stall prevention condition; and means for prohibiting the feedforward control from being performed when the engine is in the predetermined engine-stall prevention condition.

10. A lockup control method of a lockup clutch of a torque converter for a vehicle, the torque converter comprising a pump impeller connected to an engine and a turbine runner connected to an automatic transmission, and transmitting a torque between the pump impeller and the turbine runner via a fluid and the lockup clutch according to an engaging force of the lockup clutch supplied from an engaging force regulating mechanism, the method comprising:

determining a rotation speed of the pump impeller, the rotation speed of the pump impeller being equal to an engine rotation speed;

determining a rotation speed of the turbine runner;

determining a running condition of the engine;

calculating a real relative rotation speed of the pump impeller and the turbine runner from the rotation speed of the pump impeller and the rotation speed of the turbine runner;

determining a target relative rotation speed based on the running condition of the engine;

performing a feedback control of the engaging force regulating mechanism based on a difference between the target relative rotation speed and the real relative rotation speed to cause the difference to decrease;

performing a feedforward control to the engaging force regulating mechanism in an increasing direction of the engaging force based on a predetermined feedforward control value, in combination with the feedback control;

determining from the engine rotation speed whether or not the engine is in a predetermined engine-stall prevention condition; and prohibiting the feedforward control from being performed when the engine is in the predetermined engine-stall prevention condition.

* * * * *